United States Patent
Howarter et al.

(10) Patent No.: US 8,789,130 B2
(45) Date of Patent: Jul. 22, 2014

(54) SET TOP BOX BROWSER CONTROL VIA A WIRELESS HANDSET

(75) Inventors: Jamie Howarter, Overland Park, KS (US); Kelsyn Rooks, Overland Park, KS (US); Douglas Ceballos, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 924 days.

(21) Appl. No.: 12/499,484

(22) Filed: Jul. 8, 2009

(65) Prior Publication Data

US 2011/0010746 A1 Jan. 13, 2011

(51) Int. Cl.
*H04N 21/41* (2011.01)
*H04N 21/4227* (2011.01)
*H04N 21/422* (2011.01)

(52) U.S. Cl.
CPC ........ *H04N 21/4126* (2013.01); *H04N 21/4122* (2013.01); *H04N 21/42209* (2013.01); *H04N 21/42219* (2013.01); *H04N 21/4222* (2013.01); *H04N 21/4227* (2013.01)
USPC .............. 725/141; 725/38; 725/109; 725/133

(58) Field of Classification Search
USPC ........................................... 725/51
See application file for complete search history.

(56) References Cited

U.S. PATENT DOCUMENTS

| | | | |
|---|---|---|---|
| 2007/0209005 A1* | 9/2007 | Shaver et al. | 715/733 |
| 2009/0228919 A1* | 9/2009 | Zott et al. | 725/34 |
| 2010/0107201 A1* | 4/2010 | Hannum et al. | 725/99 |

* cited by examiner

*Primary Examiner* — Bennett Ingvoldstad
(74) *Attorney, Agent, or Firm* — Swanson & Bratschun, L.L.C.

(57) ABSTRACT

A system and method for providing Internet access via a set top box may include operating, on the set top box, a browser configured to display data associated with a website. A command may be received from a wireless communications device via a communications network. The command may include a network address of the website. In response to receiving the command, the website data may be displayed on a television to which the set top box is in communication.

14 Claims, 4 Drawing Sheets

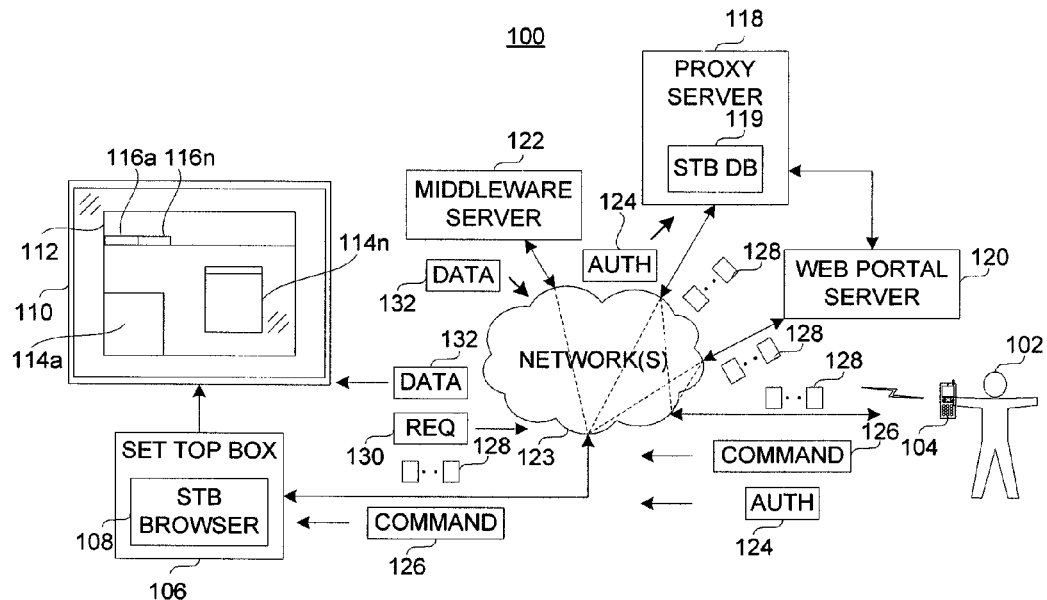
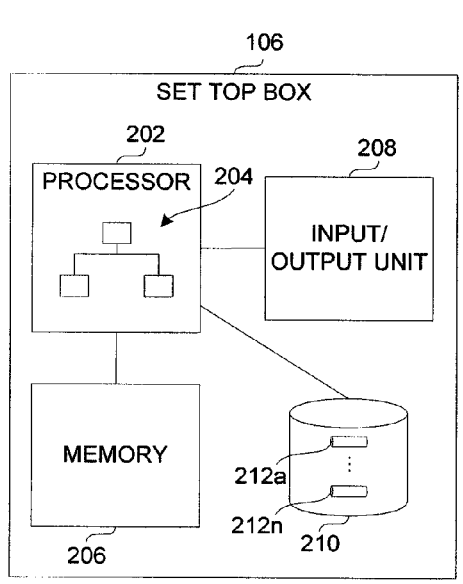
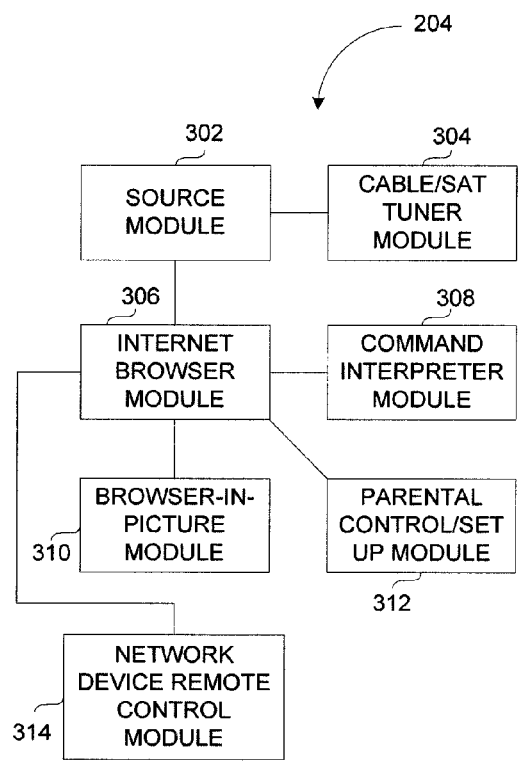

SET TOP BOX BROWSER CONTROL VIA A WIRELESS HANDSET

BACKGROUND

As media systems have become pervasive throughout society, media systems have become more and more integrated. Wireless communications devices, such as mobile telephones, have also increased in functionality. For example, mobile telephones are now capable of interfacing with websites and downloading television programs, movies, and other video media. Set top boxes are also configured to enable users to access programming guides via wireless communications devices and set up recording schedules for the set top box to record television programming. Middleware has also provided set top boxes with increased functionality. Despite media systems becoming more integrated in recent years, the level of integration is still quite limited.

SUMMARY

To overcome the limited integration of media systems, the principles of the present invention provide for a wireless communications device to communicate with a set top box configured with a browser and to respond to commands from the wireless communications device, thereby enabling a user of the wireless communications device to display content from the Internet on a television to which the set top box is in communication. The user may control operation of the browser operating on the set top box to allow the user to use the wireless communications device as a user interface while accessing the Internet via the set-top box, and view website content on the television.

One embodiment of a method for providing Internet access via a set top box may include operating, on the set top box, a browser configured to display data associated with a website. A command may be received from a wireless communications device via a communications network. The command may include a network address of the website. In response to receiving the command, the website data may be displayed on a television to which the set top box is in communication.

One embodiment of a system for providing Internet access while being remotely controlled by a wireless communications device may include, in a set top box, a memory, an input/output (I/O) unit in communication with a communications network, and a processing unit in communication with said memory and I/O unit. The processing unit may be configured to (i) operate a browser configured to display data associated with a website, (ii) receive a command from a wireless communications device via a communications network, where the command includes a network address of the website, and (iii) in response to receiving the command, display the website data on a television to which the set top box is in communication.

BRIEF DESCRIPTION

Illustrative embodiments of the present invention are described in detail below with reference to the attached drawing figures, which are incorporated by reference herein and wherein:

FIG. 1 is an illustration of an illustrative network environment that enables a user of a wireless communications device to communicate with a set top box executing a browser;

FIG. 2 is a block diagram of an illustrative set top box configured to execute a browser that may be controlled by a wireless communications device remotely located therefrom;

FIG. 3 is a block diagram of illustrative software modules configured to enable a user to control a browser being executed by the set top box of FIG. 2;

DETAILED DESCRIPTION

Figure 4:
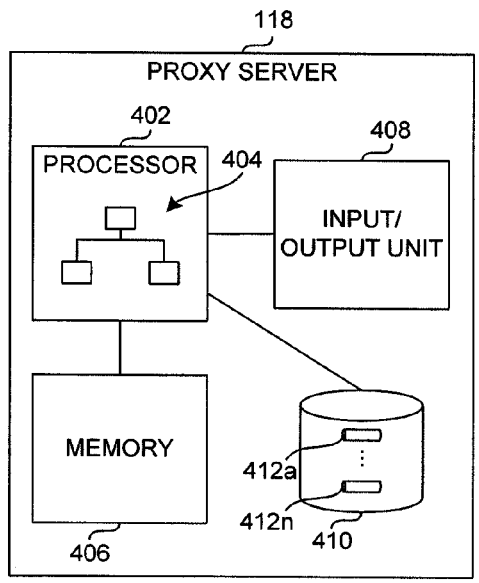
FIG. 4 is a block diagram of an illustrative proxy server configured to coordinate communications by a wireless communications device with the set top box of FIG. 2.

With regard to FIG. 1, a network environment 100 is shown to include a user 102 utilizing a wireless communications device 104. The wireless communications device 104 may be a mobile telephone, smart phone, personal communications device, or any other wireless communications device, as understood in the art. In an alternative embodiment, the wireless communications device 104 may be a telephone configured to communicate voice over internee protocol (VoIP) signals and/or be WiFi enabled. The wireless communications device 104 may be configured to communicate with a set top box 106 configured to execute a browser 108. The browser 108 may be executed by the set top box 106 to display data formatted using a mark up language, such as hyper-text mark up language (HTML), as understood in the art.

The set top box 106 may be in communication with a television 110, which may be an electronic display that does not include a tuner or does include a tuner for displaying traditional cable or satellite television, as understood in the art. As shown on the television 110, a window 112 is capable of displaying data from a website. The window 112 may display one or more frames 114a-114n (collectively 114) and tabs 116a-116n (collectively 116), as understood in the art. By utilizing the browser 108 being executed by the set top box 106 to display website data, the user 102 is able to view the website data in ways that are either not possible or not desirable to view on the wireless communications device 104.

A proxy server 118 may be configured to operate as a "go-between" for requests from the wireless communications device 104 and the set top box 106. The proxy server 118 may utilize a set top box database 119 that stores addresses of each set top box that a communications service provider is servicing and addresses of wireless communications devices. In response to receiving a request or command from a wireless communications device, the proxy server 118 may route the command or request to the appropriate set top box that the wireless communications device is associated.

A web portal server 120 may be configured to operate a web portal that enables the user 102 of the wireless communications device 104 to access and control certain aspects of the set top box 106, including configuring the browser 108, setting up passwords, establishing parental control, setting quality of service, managing account information, or performing any other aspect of communicating with the set top box 106 to use or control the browser 108. A middleware server 122 may be utilized to assist the set top box 106 with various functionality, including managing video downloads, accessing a head-end server (not shown), or, optionally, assisting the set top box 106 with accessing data on the Internet or other network. It should be understood that the term Internet is used generically to mean any communications network on which websites or other network addresses are used for a user to access via a browser or other graphical user interface environment. Each of the proxy server 118, web portal server 120, and middleware server 122 may communicate with the set top box 106 via one or more communications networks 123. The wireless communications device 104 may communicate with the proxy server 118 and web portal server 120 via the communications network(s) 123. The network(s) 123 may include the Internet, mobile communications network, or any other communications network as understood in the art.

In operation, the wireless communications device 104 may communicate an authentication request 124 that is communicated to the proxy server 118 via the network(s) 123. The authentication request 124 may include a request for the wireless communications network to access the set top box 106. The proxy server 118, in response to receiving the authentication request 124, may look up or perform a query on the set top box database 119 to determine which set top box from among the set top boxes that the communication service provider is servicing is associated with the wireless communications device 104. In one embodiment, the authentication request 124 may communicate a network address, such as telephone number, of the wireless communications device and/or an address, such as an IP address, at which the set top box 106 is assigned. The proxy server 118 may determine that the wireless communications device 104 is authorized to access the set top box 106 and respond to the wireless communications device 104 and/or set top box 106 to initiate or set up a communications link between the wireless communications device 104 and set top box 106. The communications link may be formed either directly via the network 123 or indirectly via the proxy server 118, web portal server 120, or any other server operating on the communications network (s) 123.

Once a communications link is established between the wireless communications device 104 and set top box 106, the wireless communications device 104 may be utilized by the user 102 and communicate a command 126 to the set top box 106 and be used to control the browser 108. In one embodiment, the command 126 includes a network address for the browser to access website data located at the network address. The network address may be a uniform resource locator (URL) that may be used to look-up a network address, as understood in the art. The command 126 may also be a command that causes a curser to be moved on a graphical user interface, such as a website browser interface, generated by the browser 108, being executed on the set top box 106. Each of the authentication requests 124 and command 126 may be communicated via the communications network(s) 123 using data packets 128, as understood in the art. Although shown separated on different sides of the network(s) 123, it is anticipated that the user 102 will be using his or her wireless communications device 104 as a user interface to view websites on the television 110, and, therefore, the user 102 is likely to be in the same room as the television 110. Although contemplated that the wireless communications device 104 will be used to communicate via a wireless communications network, an alternative embodiment of the wireless communications device 104 may include a transmitter, such as an RF or infrared transmitter, that may directly communicate with the set top box 106 or with the set top box 106 via a receiver external from the set top box (not shown). The set top box 106 may send a request (REQ) 130 to the proxy server 118, web portal server 120, or middleware server 122, which, in response, may communicate data 132 to the set top box 106 for controlling or being displayed by the browser 108 being executed by the set top box 106.

With regard to FIG. 2, a block diagram of the set top box 106 is shown to include a processing unit 202 that executes software 204. The processing unit 202 may be in communication with a memory 206, input/output (I/O) unit 208, and storage unit 210. The storage unit 210 may include one or more data repositories 212a-212n (collectively 212). The software 204 may be configured to perform conventional set top box functionality, such as selecting channels, downloading videos, or performing digital video recorder functionality. In addition, the software 204 may be configured to operate as a browser that may be utilized to access website data on the Internet or other communications network. In one embodiment, the website browser functionality may be the same or modified as a conventional browser, but receive commands from a wireless communications device, such as a mobile telephone. The data repositories 212 may be configured to store videos, such as televisions shows or movies, and website data generated by the browser functionality of the software 204. The I/O unit 208 may be configured to communicate via both a television network and Internet, and further be configured to communicate with respective communications protocols for handling conventional video communications and Internet communications.

With regard to FIG. 3, the software 204 may be formed of software modules for performing the functionality to operate the set top box 106, including the browser functionality. The software 204 may include a source module 302 that selects which source of communications to be received by the set top box 106 (FIG. 2). For example, the source module 302 may select to receive video from a video distribution stream or data from the Internet. A cable/satellite tuner module 304 may be configured to receive cable or satellite input into the set top box.

An internet browser module 306 may be configured to enable a user to access the Internet by communicating to the set top box via in a wireless communications device remotely located from the set top box. A command interpreter module 308 may be configured to interpret commands communicated from the wireless communications device. The commands may include commands to access a network address, such as a website, or position a curser or other graphical user element for selecting or manipulating data being displayed by the Internet browser module 306. A browser-in-picture module 310 may be configured to display a browser within a picture frame or other portion of a television screen in the same or similar manner as picture-in-picture function, as understood in the art. Alternatively, the browser-in-picture module 310 may also be configured to display an Internet browser over the entire image area of the television as opposed to within a selected region with a background image of video. A parental control/set up module 312 may be configured to enable a user to set-up the browser, establish parental controls (e.g., limit content that can be accessed on the Internet from particular telephones, such as a child's telephone), and other set up functionality.

A network device remote control module 314 may be configured as an application programming interface (API) to enable a wireless device to control conventional set top box functions. In one embodiment, an IP based API may be configured to receive set top box control commands from a defined HTML interface from a network device, such as a mobile telephone. The API on the set top box may be used to control set top box parameters, change channels, program a digital video recorder (DVR) at the set top box, control recorded video playback, etc. The API on the set top box may also allow text based data entry for set top box functions to be entered on the wireless communications device for submission to the set top box via an IP interface (e.g., search functionality to enable a user to search for show title or artist information).

With regard to FIG. 4, a block diagram of the proxy server 118 is shown to include a processing unit 402 that executes software 404. The processing unit 402 may be in communication with memory 406, I/O unit 408, and storage unit 410. The storage unit 410 may be configured to store data repositories 412a-412n (collectively 412). The software 404 may be configured to perform a number of different functionalities that enables the proxy server 118 to operate as an interface between the wireless communications device and set top box and/or support communications therebetween.

Figure 5:
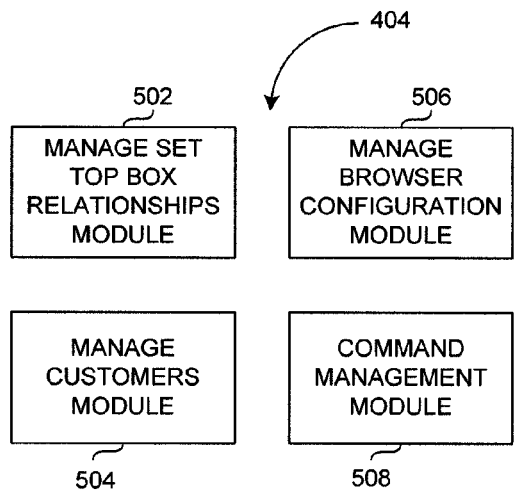
FIG. 5 is a block diagram of illustrative software modules executable by the proxy server of FIG. 4 to coordinate communications between a wireless communications device and set top box.

With regard to FIG. 5, the software 404 may include a number of modules to cause the proxy server 118 (FIGS. 1 and 4) to perform the functionality of the proxy server in terms of handling communications between the wireless communications device and set top box. The software 404 may include a manage set top box relationships module 502 that is configured to manage what wireless communications devices may have access to the set top box. In one embodiment, a user may establish telephone numbers associated with wireless communications devices that have access to the set top box. Alternatively, the user may set IP network addresses of the wireless communications devices that have access to the set top box. A manage customers module 504 may be configured to manage set top boxes of the customers who subscribe to the service of being able to control a browser being executed on a set top box by a wireless communications device. A manage browser configuration module 506 may be configured to manage a browser configuration at the set top box. The manage browser configuration module 506 may further be configured to enable a user to change preferences that a user may wish to have for the browser being executed by the set top box. For example, the configurations or preferences may include bandwidth limitations for downloading video via the browser. A command management module 508 may be configured to manage commands that a user of a wireless communications device. The command management module 508 may, for example, enable a user to submit requests to refresh a page, stop a page from loading, position a curser, perform selection operations of graphical user elements (e.g., push buttons), and any other command that may be utilized to control a browser or website displayed within the browser.

Figure 6:
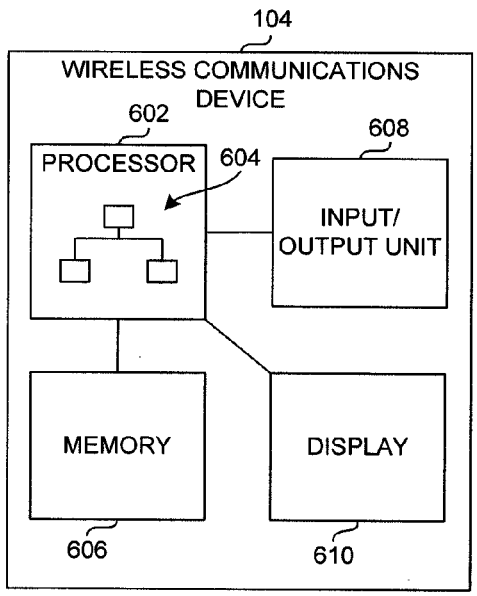
FIG. 6 is a block diagram of an illustrative wireless communications device configured to provide control of a browser being executed by the set top box of FIG. 2 remotely.

With regard to FIG. 6, a block diagram of the wireless communications device 104 is provided. The wireless communications device 104 may include a processing unit 602 that executes software 604. The processing unit 602 may be in communication with a memory 606, I/O unit 608, and display 610. The software 604 may be configured to communicate with the proxy server 118 (FIG. 1), web portal server 120, and set top box 106. The software 604 may further be configured to enable the user to display a browser on the display 610 of the wireless communications device 104. Furthermore, the software 604 may be configured to generate and communicate commands and/or queries for communication to the set top box.

Figure 7:
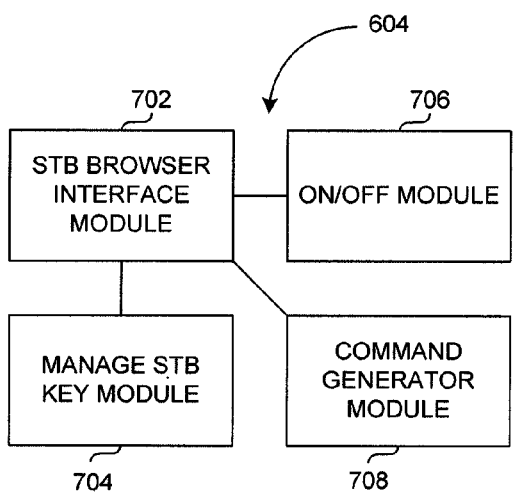
FIG. 7 is a block diagram of illustrative software executable by the wireless communications device of FIG. 6 to enable a user to control a browser being executed by the set top box of FIG. 2.

With regard to FIG. 7, a block diagram of modules of the software 604 is shown. A set top box browser interface module 702 may be part of a downloadable application or applet and be configured to interface with a set top box via the wireless communications device. The module 702 may be configured to provide a graphical user interface to which the user may interface to view website data on the wireless communications device so that the user may more easily work with the wireless communications device to control the browser being executed on the set top box. A manage set top box key module 704 may be configured to manage a key or code that the set top box or proxy server uses to ensure that the wireless communications device has authorization to access the set top box. The key may be a software key that is randomly or non-randomly generated, as understood in the art. An on/off module 706 may be configured to turn on and turn off the ability to control or otherwise communicate with the set top box. A command generator module 708 may be configured to generate commands that are used to control the browser on the set top box. The commands may be HTML, IP, or any other command that is used to control display of information on the browser, such as IP addresses and control of a curser or other graphical user element that operates or otherwise interfaces with website data being displayed on the browser generated by the set top box.

Figure 8A:
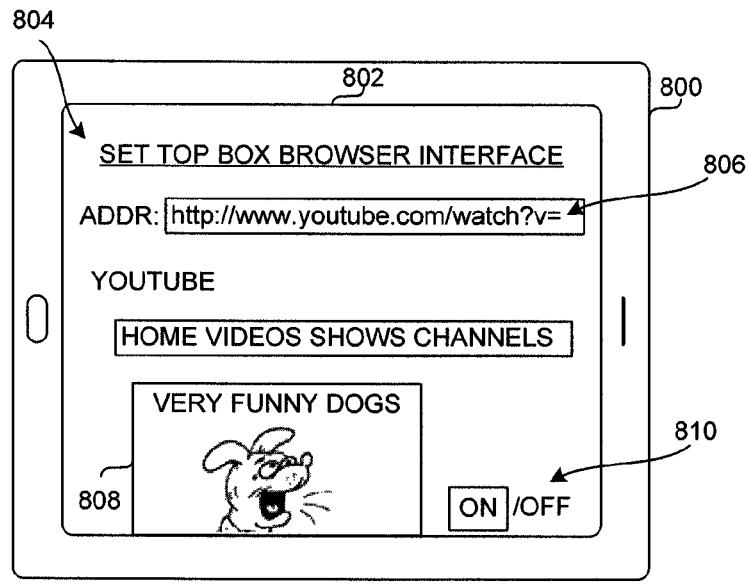
FIG. 8A is a screen shot of an illustrative website displayed on a wireless communications device.

With regard to FIG. 8A, an illustration of an illustrative wireless communications device 800 is shown. The wireless communications device 800 includes an electronic display 802 that is a touch-screen display. It should be understood that non touch-screen displays may be utilized in accordance with the principals of the present invention. On the electronic display 802, an illustrative website is shown to include website data that displays HTML data that is located at a network address associated with the website in this case, the website is YouTube and a video 808 is being displayed. However, because the electronic display 802 is limited in size, the video 808 is cut off or other portions of the web page are cut off or otherwise difficult to view. An on/off selection element 810 may be selectable by a user to turn on or off communications with an associated set top box.

Figure 8B:
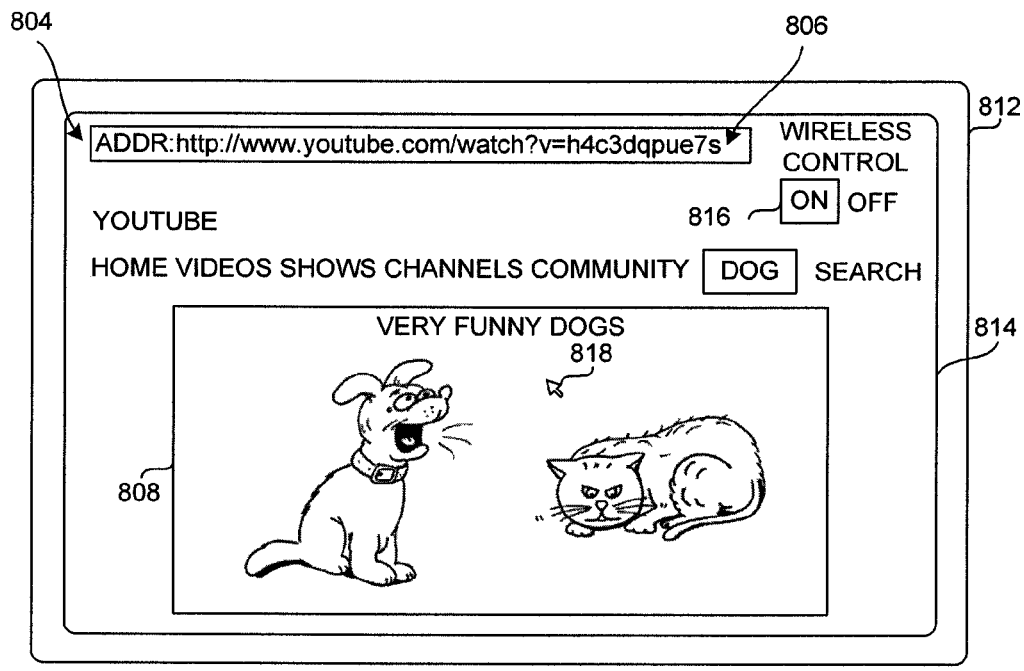
FIG. 8B is a screen shot of the website displayed on the wireless communications device of FIG. 8A being displayed on a television to which a set top box is in communication.

With regard to FIG. 8B, an illustration of an illustrative television 812 is shown to include an electronic display 814 that is displaying the website data 804 that is the same as that shown on the electronic display 802 of the wireless communications device 800 of FIG. 8A. Because the television has a much larger electronic display 814 then that of the wireless communications device 800, more of the website data may be displayed for the user. In addition, because the browser being executed on the set top box may be more functional then that of the wireless communications device, more functionality on websites that could otherwise not be handled by the browser on a wireless communications device 800 may be available to the user. As shown, the video 808 may be fully displayed on the television via the set top box. Furthermore, a quality of service (QoS) may be established such that the videos and other content being distributed from the Internet to the set top box may be communicated at real time or substantially real time. A wireless control on/off selection element 816 may be displayed and be selectable by the user or, alternatively, the on/off wireless control element may simply indicate that the set top box is or is not being remotely controlled from a wireless communications device. A cursor or other pointing graphical user element 818 may be controlled by the wireless communications device by the user pressing a hard or soft button, dragging his or her finger across a touch screen, or otherwise.

Figure 9:
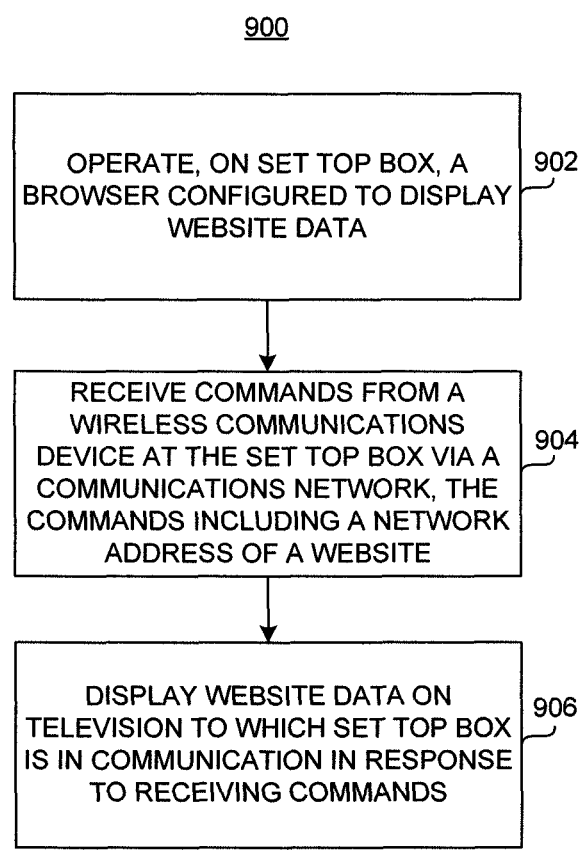
FIG. 9 is a flow diagram of an illustrative process for enabling a wireless communications device to interact with a browser being executed on a set top box.

With regard to FIG. 9, a flow chart 900 of an illustrative process for enabling a wireless communications device to operate a browser on a set top box is provided. At step 902, a browser configured to display website data may be operated on a set top box. The browser may be a conventional browser or one configured specifically for operation on a set top box that is remotely controlled by a wireless communications device. Rather than being controlled locally, the browser may be configured to receive commands from a remote wireless communications device. In another embodiment, the set top box may be configured to enable a user to locally control the browser in addition to the browser being able to be controlled by the wireless communications device. At step 904, commands may be received from a wireless communications device at the set top box via a communications network. The commands may include a network address of a website. In addition, the commands may be commands to control one or more graphical user interface elements, such as a curser or other pointing element. The wireless communications device may issue commands or queries to control operation of the browser and include website addresses that a user wishes to display on the browser. At step 906, website data may be displayed on a television to which the set top box is in communication in response to receiving the commands. The wireless communications device may simultaneously display the website data. Alternatively, the wireless communications device may simply be a conduit to which the user enters commands to control the website being displayed on the browser from the set, top box. In other words, the wireless communications device may provide a user interface as a blank or non-blank screen that can assist the user in controlling the browser operating on the set top box in substantially real time. For example, the user interface may provide for controlling a cursor or other pointing graphical user element or enter alphanumeric text, such as a website address.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method for providing Internet access via a set top box, said method comprising:
 operating, on the set top box, a browser configured to display data associated with a website;
 receiving, at a proxy server and via a communications network, a request from a wireless communications device to communicate with the set top box, the request comprising an identifier of the wireless communications device;
 querying, with the proxy server, independent of a user input, a database to identify the set top box as being associated with the wireless communications device;
 determining, with the proxy server, independent of a user input, that the wireless communications device is authorized to communicate with the set top box;
 establishing a communications link between the wireless communications device and the set top box, in response to determining that the wireless communications device is authorized to communicate with the set top box;
 receiving, at the set top box, a command from a wireless communications device via a communications network, the command including a network address of the website;
 in response to receiving the command, displaying the website data on a television to which the set top box is in communication; and
 enabling a user to control a curser on the television in substantially real time through a touch screen of the wireless communications device.

2. The method according to claim 1, wherein receiving the command from a communications device includes receiving the command from a mobile telephone.

3. The method according to claim 1, wherein receiving the command includes receiving the command via an Internet protocol (IP) communication.

4. The method according to claim 1, further comprising downloading an application to the wireless communications device to enable a user to communicate the commands to the set top box.

5. The method according to claim 1, further comprising simultaneously displaying the website data on the television and the wireless communications device.

6. The method according to claim 1, wherein displaying the website data on the television includes displaying the website data in a window on the television.

7. The method according to claim 1, wherein displaying the website data on the television includes displaying tabs and frames as defined by the website data.

8. A system for providing Internet access while being remotely controlled by a wireless communications device, said system comprising:
 a set top box, comprising:
  a memory;
  an input/output (I/O) unit in communication with a communications network;
  a processing unit in communication with said memory and I/O unit, said processing unit configured to:
   operate a browser configured to display data associated with a website;
   receive a command from a wireless communications device via a communications network, the command including a network address of the website; and
   in response to receiving the command, display the website data on a television to which the set top box is in communication; and
 a proxy server configured to:
  receive a request from the wireless communications device to communicate with the set top box, the request comprising an identifier of the wireless communications device;
  query, independent of a user input, a database to identify set top box as being associated with the wireless communications device;
  determine, independent of a user input, that the wireless communications device is authorized to communicate with the set top box;
  establish a communications link between the wireless communications device and the set top box, in response to determining that the wireless communications device is authorized to communicate with the set top box; and enable a user to control a curser on the television in substantially real time through a touch screen of the wireless communications device.

9. The system according to claim 8, wherein the command is received from a mobile telephone.

10. The system according to claim 8, wherein the command is received via an Internet protocol (IP) communication.

11. The system according to claim 8, further comprising a software application downloadable to the wireless communications device to enable a user to communicate the commands to the set top box.

12. The system according to claim 8, wherein said processing unit is further configured to simultaneously display the website data on the television when the website data is being displayed on the wireless communications device.

13. The system according to claim 8, wherein said processing unit is configured to display the website data in a window on the television.

14. The system according to claim 8, wherein said processing unit is configured to display tabs and frames as defined by the website data.

\* \* \* \* \*